Patented Sept. 9, 1924.

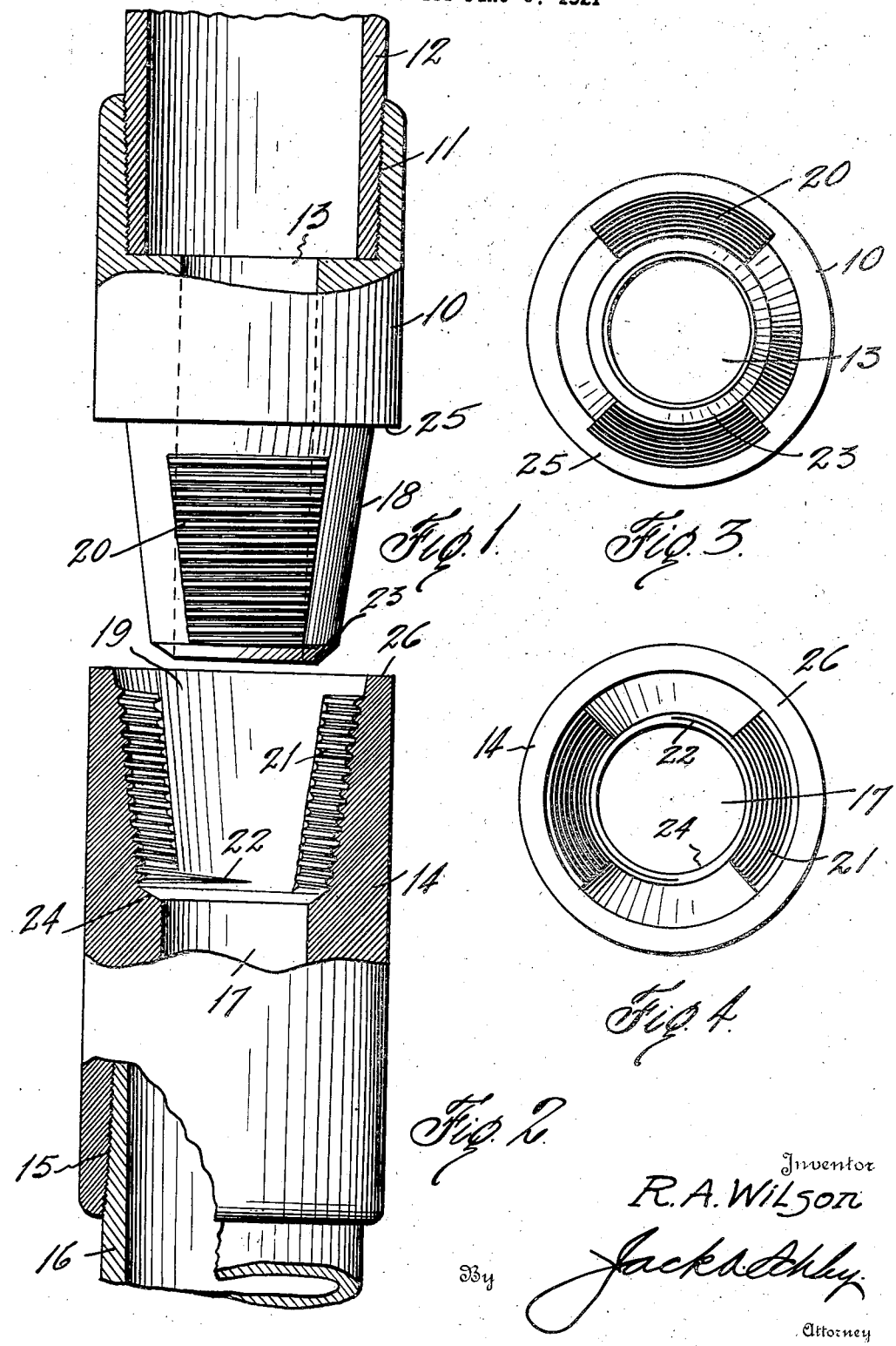

1,507,877

UNITED STATES PATENT OFFICE.

ROBERT A. WILSON, OF DALLAS, TEXAS, ASSIGNOR TO GUIBERSON CORPORATION, OF DALLAS, TEXAS, A CORPORATION OF DELAWARE.

TOOL JOINT.

Application filed June 6, 1921. Serial No. 475,470.

*To all whom it may concern:*

Be it known that I, ROBERT A. WILSON, a citizen of the United States, residing at Dallas, in the county of Dallas and State of Texas, have invented certain new and useful Improvements in Tool Joints, of which the following is a specification.

This invention relates to new and useful improvements in tool joints for rotary well boring tubings.

The invention has particularly to do with improvements in the type of joint which employs a box and tapered pin, such as is illustrated in the patent to Whittier, issued July 12, 1910, No. 964,353. By employing the tapered pin and a corresponding seat for the same in the box, the parts of the joint may be disconnected by rotating the pin four or five complete turns. However, while this is an improvement it still consumes considerable time to disconnect the joint in a string of tubing measuring two or three thousand feet.

The object of my invention is to provide a tool joint which may be disconnected immediately by giving thereto only a quarter turn, and thus saving a great amount of time and labor. Another feature of the invention resides in the provision of double threads starting and ending diametrically opposite each other, whereby the advantage of a cross stitch is had and the area of a fine thread is obtained.

An important and essential feature of the invention resides in the provision of a complete thread at the bottom of the seat which receives and supports the mutilated threads of the pin so as to guide the latter into the threads of the seat when the joint is connected. It is pointed out that if the continuous thread is not provided it will be necessary to lift or elevate the pin in order to cause this thread to enter the thread of the seat and such an operation would be impractical.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a view of a pin member of a joint constructed in accordance with my invention, a portion being shown in elevation and a portion in section, Fig. 2 is a view of a box constructed in accordance with my invention, a portion being shown in elevation and a portion in section, Fig. 3 is an underside view of the pin member, and Fig. 4 is a plan view of the box.

In the drawings the numeral 10 designates a pin member which has a screw threaded socket 11 in its upper end to receive the usual screw threaded well tubing 12. The member is provided with a longitudinal bore 13.

The member 10 constitutes one portion or element of the joint and a box 14 constitutes the other element. The lower end of the box 14 is provided with a screw threaded socket 15 receiving the screw threaded end of the well tubing 16. The box has a longitudinal bore 17. The member 10 and box 14 are screwed onto the tubing sections 12 and 16 in the usual manner, the threads being comparatively fine and the parts tapered as is a common practice. In using the joint the member and box are not unscrewed from the tubing sections, but remain thereon.

The member 10 is provided with a depending tapered pin 18, while the box is formed with a counter sunk tapering seat 19 for receiving said pin. The pin is provided with mutilated threads 20 arranged in panels occupying substantially one quarter of the area of the pin, and disposed on opposite sides, whereby gaps are provided between the thread panels also diametrically arranged. In forming the threads the pin is provided with a coarse thread, the convolutions of which are spaced sufficiently to admit the forming of a second thread of the same pitch intermediate said convolutions. The second thread is started diametrically opposite from the first thread. From the foregoing it will be seen that one of the threads begins at the lower end of the said panel on one side of the pin, while the other thread begins at the lower end of the said panel on the other side of the pin. By this arrangement a coarse thread is provided but the advantage of the area or bearing surface of a fine thread is had.

The seat 19 is provided with threads 21 which are mutilated and formed into diametrically opposed panels having substantially the same width as the gaps between the threads of the pin, so that the pin may be inserted into the seat and the thread panels received in the gaps between the threads of the box. It is merely necessary to insert the pin in the seat 19 and to give the member 10 a quarter turn, whereby the threads 21 ride into threads 22 and couple the parts of the joint together.

It is pointed out, however, that some means must be provided for guiding the blunt ends of the threads 20, between the threads 21, otherwise the ends of said threads would abut and prevent threading. To care for this I provide at the bottom of the seat continuous threads 22, one for each of the double threads 20. These threads 22 extend entirely around the bottom of the seat 19 and terminate on opposite sides in the gaps between the threads 21 as is best shown in Fig. 4. The lower end of the pin 18 is beveled as is indicated at 23 and this beveled end engages with an inclined shoulder 24 at the bottom of the seat 19.

It will be seen that when the pin is inserted in the seat of the box, the lowest thread 20 will rest on the continuous thread 22 and when the pin is given a quarter turn the threads 20 will ride into the threads 21 smoothly and easily. The rotation of the pin is limited by the engagement of the beveled end 23 with the shoulder 24, which produces a slight wedging action. Also the upper end of the pin is surrounded by a laterally directed shoulder 25 having a flat face which comes to rest on top of the finished upper surface 26 of the box when the parts are brought together.

The bore 13 also extends thru the pin 18 and registers with the bore 17 when the joint is coupled together. It will be seen that the frictional contacts provided between the parts 23 and 24 and 25 and 26 will be considerable and, therefore, the pin will not readily unscrew from the box. However, when it is desired to disengage the parts, it will only be necessary to give the member 10 a quarter turn in order to lift the pin from the seat 19. Any suitable marks may be employed for indicating when the member has been turned far enough to withdraw the threads 20 from the threads 21.

What I claim, is:

A rotary well boring box and pin comprising the combination of a pin having double threads arranged in spaced panels on diametrically opposite sides thereof, said pin having a shoulder at its upper end, and a box having a socket shaped to receive said pin and provided with double threads arranged in panels to mesh with the panels of the pin, each of the double threads upon the pin riding upon a continuous thread at the bottom of the socket, whereby the panels of the pin and box are meshed upon quarter turn of the pin.

In testimony whereof I affix my signature.

ROBERT A. WILSON.